Figure 1:
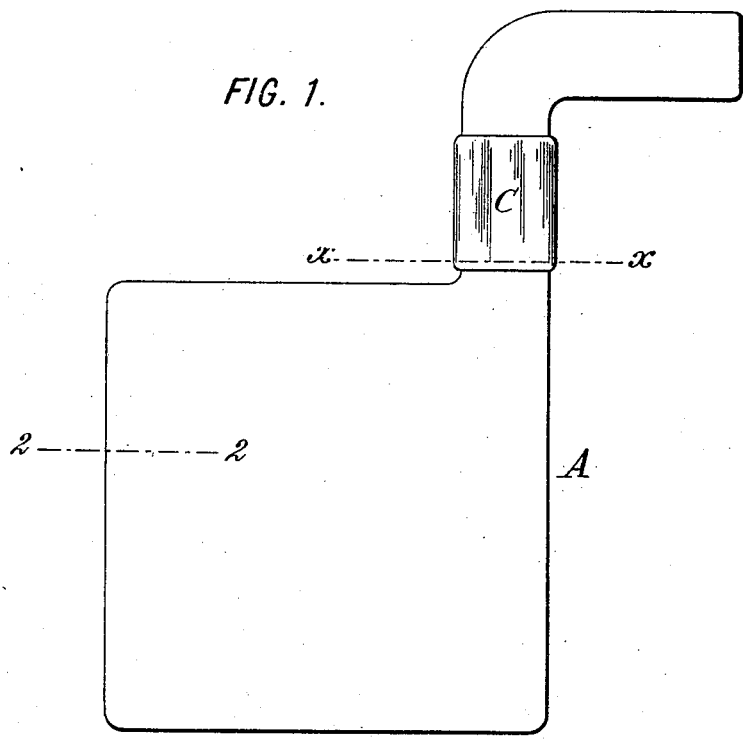

No. 762,227. PATENTED JUNE 7, 1904.
H. BLACKMAN.
ANODE AND PROCESS OF MAKING SAME.
APPLICATION FILED APR. 24, 1903.
NO MODEL.

WITNESSES:
Fred White.
Thomas F. Wallace

INVENTOR:
Henry Blackman,
By Attorneys,
Arthur G. Dreser

THE NORRIS PETERS CO., PHOTO-LITHO., WASHINGTON, D. C.

No. 762,227.

Patented June 7, 1904.

UNITED STATES PATENT OFFICE.

HENRY BLACKMAN, OF NEW YORK, N. Y.

ANODE AND PROCESS OF MAKING SAME.

SPECIFICATION forming part of Letters Patent No. 762,227, dated June 7, 1904.

Original application filed December 8, 1896, Serial No. 614,894. Divided and this application filed April 24, 1903. Serial No. 154,163. (No model.)

*To all whom it may concern:*

Be it known that I, HENRY BLACKMAN, a citizen of the United States, residing in the borough of Manhattan, city, county, and State of New York, have invented certain new and useful Improvements in Anodes and Processes of Making the Same, of which the following is a specification.

This invention relates to anodes for use in electrolytic decompositions, of which the electrolysis of sodium chlorid is a type, and is a division of my application for patent, Serial No. 614,894, filed December 8, 1896.

My invention provides an improvement in anodes the exposed surface of which is of dense electroconductive iron oxid. In my Patent No. 568,231, dated September 22, 1896, I have claimed an anode for use in electrolytic decomposition, consisting of an electroconductive oxid of iron in a dense impermeable mass. Such electroconductive iron oxid may be magnetite ($Fe_3O_4$) or other magnetic iron oxid. According to my said patent I contemplated forming the anode as a plate or slab by sawing or chipping from the native mineral, such as magnetite or ilmenite, or by fusing the mineral with the addition of a flux and casting the plates or by applying the magnetic oxid as a coating upon an iron plate.

According to my present invention I provide an anode the interior of which is of iron or steel, while the exterior is of magnetic iron oxid, the iron and the oxid being integral with one another—that is, both being parts of one simple piece of metal and not being separately formed and then united into a compound plate—and the oxid being of sufficient thickness and density to wholly cover and protect the iron from the oxidizing action during electrolysis. To produce this anode according to my present invention, I take a plate of cast-iron preferably (or wrought-iron or steel may be used) and oxidize its surface by suitable treatment in such manner as to convert it into magnetic or electroconductive oxid and continue the treatment until the oxid thus produced is of such thickness and density as will effectually cover, inclose, and protect the underlying iron. Thus the oxid exterior is integral with the iron interior— that is to say, the two are one body—the fibrous or crystalline structure of the iron extending through the coating of oxid uninterrupted or unchanged except to the extent that the chemical character of the iron is changed by the combination with it of oxygen.

Another feature of my invention consists in the protection of the electrodes from the active corroding influence which occurs at the surface of the electrolyte. I have found that an anode of even pure magnetic iron oxid suffers from corrosion at the surface of the electrolyte, although perfectly resistant to corrosive action elsewhere. The cathode also is corroded in like manner. I have tried numerous protective coatings for shielding the electrodes at this point, such as vulcanized rubber and other insulating compositions, but without effect. I have therefore devised a means for successfully protecting this portion of the electrode, which consists in covering it with a band of insulating and impervious material, such as glass or a vitreous glaze, united, as by fusing, upon the surface of the electrode, so as to effectually prevent all electric action at or near the surface of the electrolyte.

Figure 2:
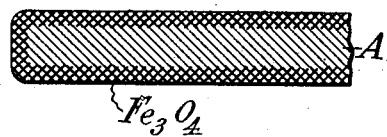
Figure 3:
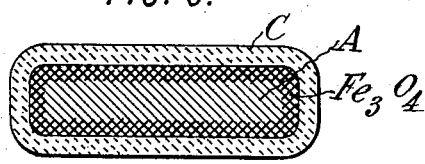

Figure 1 of the accompanying drawings is an elevation of an anode made in accordance with this invention. Fig. 2 is a section of the same on the line 2 2 of Fig. 1. Fig. 3 is a section of the same on the line $x$ $x$ of Fig. 1.

Referring to the embodiment of the invention illustrated, A designates the anode-plate, which is immersed to the level of the line $x$ $x$ in the electrolyte. The anode may be of any suitable shape above said level for making electrical connection with the conductor or bus-bar connecting the several anodes together. I prefer to form it with arms or elbows extending first upwardly and then horizontally, as shown, the outer ends of these arms being clamped to the bus-bars by means of any suitable screw-clamp. The shape of the electrodes, however, is not essential to my invention.

The anode-plate A is first formed by casting or forging and is then treated for the proper oxidation of its surface or of that portion of its surface which is exposed below the level of the electrolyte. This treatment consists, essentially, in exposing it to oxidizing agents under such conditions as to convert the exterior portion of the iron into magnetic iron oxid, either $Fe_3O_4$ or other composition of magnetic or electroconductive oxid. The treatment must be continued until the oxid is formed of sufficient thickness and density to be impermeable to the chlorin or other oxidizing agents liberated at the anode during electrolysis in order that the layer of oxid may protect the underlying iron from corrosion. Not even the minutest pin-hole must be left unprotected.

The oxidation of the iron may be effected in various ways. One suitable mode is to place the anode-plates in a muffle or retort and heat them, by passing burning gas through it or by heat otherwise applied, to a temperature of from 1,000° to 1,200° Fahrenheit and then to pass through the heated chamber steam which has been superheated to approximately the same temperature under or slightly above atmospheric pressure, this process being continued for several hours, ordinarily eight or ten hours, or until the coating attains a thickness of from one to three millimeters. It is advantageous during the process to inject into the retort a small quantity of naphtha or other light hydrocarbon, which somewhat modifies the nature of the coating, converting it partially into a compound of hydrogen, iron, and carbon or a double carbid of hydrogen and iron. This coating, however, has apparently the same properties under electrolytic action as a coating of pure magnetic iron oxid, and hence comes equally within my invention. At the conclusion of the treatment the anodes should be left in the retort and free from exposure to air until partially cooled to avoid danger of the oxid or carbid coating scaling off by unequal contraction.

I also contemplate the oxidation of the exterior of the anodes by first coating the iron plate with a thin film of some other metal, as tin or bronze, and then exposing the same to a current of oxidizing-gas while heated to 1,000° Fahrenheit or upward, whereby the oxygen penetrates through the surface-coating, oxidizes the body of the iron, and forms magnetic oxid, the thickness of the latter increasing according to the period of exposure. The original film of coating metal disappears during the process. The first coating may be applied by electroplating or by dipping.

I also contemplate the oxidation of the anodes by other chemical treatment. For example, a bath may be prepared of fused niter containing a small percentage of peroxid of manganese, which in an ordinary melting-pot is kept at a temperature of about 650° Fahrenheit. Into this bath the anodes may be plunged and left for a greater or less time until the iron surfaces are oxidized to the required depth.

Other chemical means exist by which the iron surface can be converted into electroconductive and acid-resisting oxids. Any such process comes within the intent of my invention. My experience thus far, however, leads me to prefer the process first described by reason of its capability of producing an oxidized layer of any desired thickness. The thickness of oxid required by my invention is much greater than that required merely to protect iron from rusting under exposure to atmospheric conditions. The exact thickness depends upon the character of the iron and the smoothness and uniformity of its surface, since a perfectly smooth iron casting wholly free from blow-holes and sand-pitting requires but a comparatively thin layer of oxidation, while a defective casting requires that the oxidation shall be carried to such depth as to protect the iron where it is liable to be exposed by reason of the imperfections.

It will be understood that the anode may be of steel instead of iron, the word "iron" as used in this specification and claims being intended to include steel.

For protecting the electrodes from corrosion near the surface of the electrolyte each is provided with a band or layer of glass or vitreous glaze, (denoted at E.) This band is formed around that portion of each electrode adjacent to the level of the electrolyte and should be continued, preferably, somewhat above and below this level in order to fully protect the plate from corrosion. Fig. 3 shows the anode in cross-section, with its iron interior and oxidized surface and the glass band C around it. This band of glass may be applied in any manner known to glass-workers—as, for example, by heating the anode to approximately the softening-point of glass and applying a strip of plastic or semimolten glass around it—or a glaze may be prepared in the form of a powder with a cementitious vehicle by which it is united to the anode, after which the latter may be baked in order to vitrify and set the glaze, as is practiced in the glazing of earthenware.

Though I have described with great particularity of detail certain anodes and processes embodying my invention, yet it is to be understood that the invention is not limited to the specific embodiments disclosed. Various modifications thereof are possible to those skilled in the art without departure from the invention.

What I claim is—

1. An electrolytic anode the interior of which is of iron and the exterior of which is of dense impermeable non-corrodible magnetic iron oxid covering and protecting the iron interior.

2. An electrolytic anode the interior of which is of iron and the exposed exterior of which is of impermeable magnetic iron oxid integral with said iron, and of thickness and density sufficient to protect the iron from the action of oxidizing agents developed at the anode during electrolysis.

3. An electrolytic anode consisting of a plate of cast-iron the surface of which is oxidized to a magnetic oxid of sufficient thickness density and impermeability to protect the iron.

4. The process of making an anode which consists in casting a plate of iron and oxidizing the surface thereof to a magnetic oxid of sufficient thickness density and impermeability to protect the iron.

5. The described process of making an anode, consisting in forming a plate of iron, and exposing it at a high temperature to the action of superheated steam, until its exterior is converted into magnetic iron oxid of thickness sufficient to protect the underlying iron from oxidation during electrolysis.

6. An electrode for electrolytic apparatus, having a protecting layer of glass or vitreous glaze fused to it in a band around that portion of the electrode which is destined to be exposed at the surface of the electrolyte.

7. An anode for electrolytic apparatus, the exposed exterior of which is of dense impermeable magnetic iron oxid, having a protecting layer of glass or vitreous glaze fused to it in a band around that portion of the anode which is destined to be exposed at the surface of the electrolyte.

In witness whereof I have hereunto signed my name in the presence of two subscribing witnesses.

HENRY BLACKMAN.

Witnesses:
 FRED WHITE,
 THOMAS F. WALLACE.